April 17, 1934. L. LARSEN Re. 19,141
SPRING BASE FURNITURE
Original Filed Feb. 26, 1931
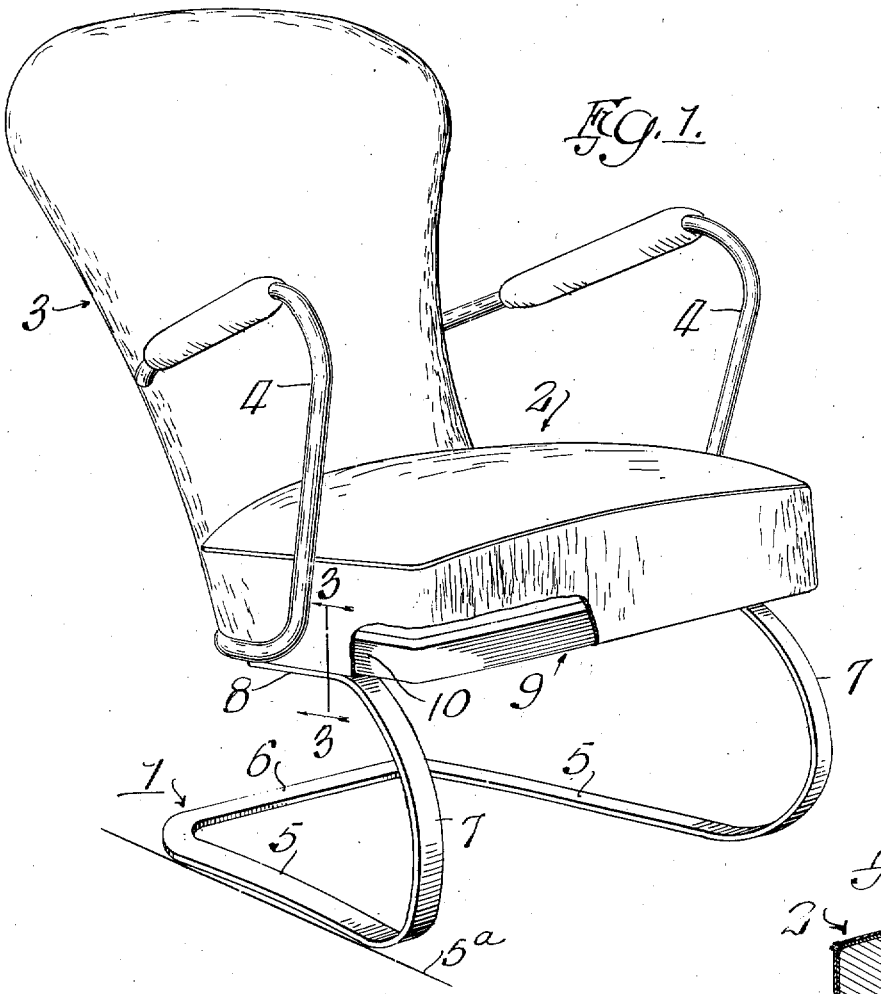
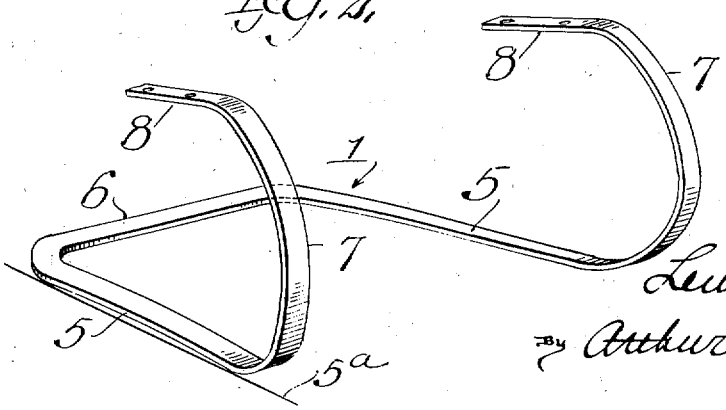
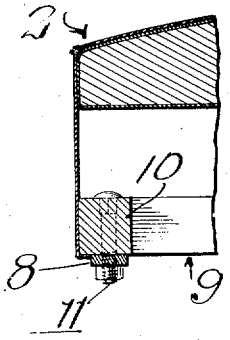
Inventor
Lewis Larsen
By Arthur Mc Kelvie
Attorney Reissued Apr. 17, 1934

Re. 19,141

UNITED STATES PATENT OFFICE 19,141

SPRING BASE FURNITURE

Lewis Larsen, Menominee, Mich., assignor to Heywood-Wakefield Company, Boston, Mass., a corporation of Massachusetts Original No. 1,875,034, dated August 30, 1932, Serial No. 518,358, February 26, 1931. Application for reissue August 7, 1933, Serial No. 684,082

4 Claims. (Cl. 155—50)

This invention relates to improvements in spring base furniture and it consists of the matters hereinafter described and more particularly pointed out in the appended claims.

The primary object of the invention is to provide a simple and efficient spring base for chairs and other articles of furniture made from a single length of stock and including a U-shaped floor engaging portion, each side member of which is curved to provide the flexible part of the base where it is of a flat cross section and is then extended rearwardly for attachment to the seat frame of the chair.

Another object of the invention is to so form the floor engaging members of the base as to permit of a better spring action without inducing a lifting tendency to the front of the chair when occupied and used in the manner intended.

The above mentioned object of the invention, as well as others, together with the many advantages thereof, will more fully appear as I proceed with my specification.

In the drawing:

Fig. 1 is a perspective view of a chair having a spring base embodying my invention.

Fig. 2 is a perspective view of a base embodying my invention.

Fig. 3 is a detail vertical sectional view through one side of the seat frame illustrating the manner in which it is attached to the base, the plane of the section being indicated by the line 3—3 of Fig. 1.

In general the base comprises a member made of flat spring stock and having a substantial U-shaped floor engaging part, the front end of the side members of which are being formed on a curve of about 180° so that the extremities of said members provide arms that face rearwardly and are adapted to have secured thereto the seat frame of a chair or the like.

Referring now in detail to that embodiment of the invention illustrated in the drawing, and particularly to Fig. 1 thereof, the chair shown therein comprises a base 1 and a seat 2 with which is associated the back rest 3 and side arms 4.

The base 1 which is made of flat spring stock comprises a substantially U-shaped floor engaging part that includes substantially horizontally disposed floor engaging side arms or members 5—5 connected together at their rear ends by a cross bar 6. The front end of each side member or arm is made as a curve 7 of about 180° in length and the extremity of each end extends rearwardly a suitable distance to provide seat frame engaging parts 8, that terminate short of the plane of the cross member 6. In this respect it is pointed out that the side members 5—5 not only converge slightly toward the cross bar 6 but are slightly bowed or arched upwardly between their ends as is apparent by the straight comparison line 5a in Fig. 2. The seat frame engaging parts 8 converge in a manner corresponding to said floor engaging members.

When the base thus far described is employed in a chair, the seat 2 includes a bottom frame 9 of wood or the like. The side members 10 of such a seat frame are engaged upon the parts 8 of the base and bolts 11 are employed to secure them together. The back rest 3 and side arms 4 which form no particular part of the present invention, are supported from the seat frame in any suitable manner.

When such a seat is occupied, a rocking movement takes place, due to the yielding flexing spring action of the curved parts 7—7 of the base. Due to the slight upward arching or bowing of the side members, in the flexing of the curved parts 7, the side members tend to straighten out and thus resist any lifting action of the front part of the base. This arrangement in connection with the cross bar 6, which is disposed in a plane to the rear of the seat frame, effectively eliminates tipping over rearwardly of the chair as when the occupant sets up a rocking movement therein.

It is essential in the invention if the best results are to be obtained that at least a part of the base be of a flat cross section and preferably such a cross section is formed in the curved parts. In this manner, a better rocking action is possible than if the entire base were made of tubing because when tubing is so used and especially in the curved parts, buckling is most apt to occur on the inside of the curve whereby crystallization of the metal is set up at this point with resulting loss of spring action and more often a breakage.

Preferably the entire base is made of stock of a flat cross section as such stock is more readily formed to the desired shape than is tubing. Such flat cross section stock better resists any lateral swaying which would soon rack the seat frame out of shape.

By making the base separate from the seat, such a base may be easily replaced should breakage occur.

While in describing the invention, I have referred in detail to the form, arrangement and construction of the various parts thereof, the same is to be considered merely as illustrative so that I do not wish to be limited thereto except as may be specifically set forth in the appended claims.

I claim as my invention:

1. A base for an article of furniture embodying therein, upwardly bowed floor engaging side members connected together at their rear ends and rearwardly extending seat frame engaging members spaced above said side members and each connected to the front end of an associated side member by a substantially semi-cylindrical curved part.

2. A base for an article of furniture made from a strip of flat spring stock and formed to provide upwardly bowed floor engaging side members connected together at their rear ends by a cross member, and rearwardly extending seat frame engaging parts spaced above said side members and terminating short of the plane of the cross member, each seat frame engaging part being connected to the front end of an associated side member by a curved part of substantially 180° in arcuate length.

3. An article of furniture embodying therein a base portion including side members, each having floor engaging front and rear end portions and an upwardly bowed mid portion connecting said end portions, a member connecting the rear end portions of both side members, a flexible portion rising from the front end portion only of each side member and terminating in a rearwardly extending portion, and a seat and back supported by said last mentioned portions.

4. An article of furniture embodying therein a base portion made from a single strip of metal to form side members, each having floor engaging front and rear end portions and an upwardly bowed mid portion connecting said end portions, a member connecting the rear end portions of both side members, a flexible portion rising from the front end portion of each side member and terminating in a rearwardly extending portion and a seat and back supported by said last mentioned portions.

LEWIS LARSEN.